United States Patent Office 3,222,336
Patented Dec. 7, 1965

3,222,336
COPOLYMERS OF ETHYLENE AND
VINYL STEARATE
Thomas S. Heines, Jr., Arthur, and Charles Robert
Donaldson, Tuscola, Ill., assignors to National Distillers and Chemical Corporation, New York, N.Y., a corporation of Virginia
No Drawing. Filed Feb. 5, 1963, Ser. No. 256,256
5 Claims. (Cl. 260—87.3)

This invention relates to the manufacture of copolymers of ethylene and is particularly concerned with copolymers of ethylene with vinyl stearate. Still more particularly it relates to the manufacture of copolymers of ethylene and vinyl stearate that are especially suited for use in general packaging operations.

In manufacturing films from ethylene polymers, especially films that are to be converted into bags for foodstuffs (fresh produce, candy, nuts, poultry, meat, etc.), soft goods, pharmaceutical and surgical supplies, hardware, toys, and the like, it is important that the film product have, among other characteristics, outstanding mechanical properties, that is, the film must be tough and flexible in order to withstand mechanical shocks and stresses to packages assembled therefrom. It is desirable also that the resin from which the film is produced should have good processing properties, such as, for example, high drawdown rate and heat sealability.

It is known that ethylene can be polymerized with unsaturated esters of organic acids, for example, vinyl acetate, to produce a wide variety of copolymers. In general, however, special synthesis conditions or process equipment have been required to make such polymers.

It is an object of this invention to overcome the disadvantages of the prior art processes for producing copolymers of ethylene.

It is another object of the invention to provide a process whereby a polyethylene copolymer product can be obtained using the apparatus and techniques already in commercial practice for large-scale production of polyethylene.

Another object of the invention is to provide a combination of reactants, reaction conditions, and reaction-influencing substances that gives results in a high pressure process that are quite different from results previously achieved in high pressure polymeriaztion.

Additional objects and advantages will become apparent from the following detailed description.

It has now been found that a resin product having a novel combination of properties that makes it particularly attractive for use in molding or in manufacturing films can be prepared by subjecting ethylene in admixture with a small amount, for example between about 0.1 weight percent and about 15 weight percent, based on ethylene, of vinyl stearate as a comonomer to selected polymerization conditions of elevated temperature and elevated pressure in the presence of a suitable catalyst and a suitable catalyst carrier.

The resulting copolymer has a density of about 0.916 to about 0.940, a melt index in the range of about 1 to about 10, and, in addition, good processing and mechanical properties. The copolymer may be converted into a product that has increased stress crack resistance, decreased strength, and decreased stiffness.

The copolymers produced in accordance with this invention have thus acquired improved mechanical properties without detrimental effect on their other physical properties that make them particularly applicable for use in molding and in firm extrusion. For example, the product is an easily-handled, good-working resin. Since the flow characteristics of the resin are excellent, high-impact film may be produced from it at high production rates. When conventional additives are used, the film has excellent printability; it can be handled without difficulty on automatic bag-making and packaging machinery; and bags made from these films stack without blocking, fill easily, and seal readily and securely. Suitable additives are compounds such as, for example, saturated amides for control of slip and blocking behavior.

The amount of comonomer used can vary from about 0.1 up to about 15 percent by weight, based on the ethylene feed; preferably about 2 up to about 10 weight percent is used.

The catalyst selected for the process of this invention can be any ethylene copolymerization catalyst suitable for use under the reaction conditions embodied herein. Particularly suitable are t-butyl perpivalate, t-butyl perbenzoate, dilauroyl peroxide, t-butyl peracetate, t-butyl peroxide, and other compounds of comparable free radical activity, and mixtures thereof. The amount of catalyst employed can vary over a wide range of from about 0.001 up to about 5 weight percent, based on the ethylene feed. The catalyst can be used alone or it can be used in the presence of a catalyst carrier, that is, an inert liquid solvent or diluent such as, for example, benzene, hydrocarbon oils such as mineral oils, kerosenes, saturated hydrocarbons, and the like, and mixtures thereof. The amount of catalyst carrier can range from 0 up to about 100 percent by weight, based on the catalyst solution, and it is preferably used in an amount of from about 80 to 99 percent.

As set forth above, the process in accordance with the present invention is carried out at conditions used in the high pressure polymerization of ethylene to prepare high molecular weight polymers. In general, the ethylene admixed with the comonomer is compressed by multi-stage compressors up to the operating pressure in the polymerization reactor. The catalyst with or without a catalyst carrier and with other additives, if desired, such as, for example, up to about 5.0 weight percent, based on the catalyst carrier, of an antioxidant, are injected into the ethylene feed line. In the polymerization reactor the ethylene and the comonomer are polymerized to form a solid or semi-solid copolymer under pressures within the range of about 18,000 to about 45,000 pounds per square inch, and preferably about 20,000 to about 40,000 pounds per square inch, and at temperatures within the range of about 250° to 500° F. and preferably about 300° to 450° F. The product copolymer and the unreacted gas are then passed through pressure let-down valves into gas separators, which may be one or more in series. The unreacted gas is separated and recycled, if desired, to the ethylene feed line. The copolymer product remaining in the final gas separator is extruded, cooled to room temperature, and subjected to conventional after-treatment steps, such as chopping, shredding, reprocessing, blending, Banburying, or the like.

In order to get the preferred copolymer product, it is essential both that the pressure be in the range of about 18,000 to 45,000 p.s.i. and that the temperature be within the range of 250° to 500° F. If the pressure is substantially below about 18,000 p.s.i. or substantially above about 45,000 p.s.i. or if the temperature is substantially below about 250° F. or substantially above 500° F., the resulting copolymer does not have the desired combination of properties.

The relative ease with which this improved copolymerization process can be carried out is an obvious advantage. As previously stated, there is no need to employ special equipment or reaction techniques in practicing the inventive method. Single-stage or multi-stage processes can be utilized, and the copolymerization can be carried out as a bulk polymerization or in the presence of solvents, such as benzene, or of dispersants, such as water. The pressure attained can be achieved as usual by pressuring the reactor to the desired degree with ethylene. It will be understood that the usual polymer recovery processes are applicable to the method of this invention; for example, the unreacted ethylene and comonomer can be separated from the molten copolymer in a vessel in which the temperature is essentially that of the reaction and the pressure is reduced to about one-tenth that of the reaction. The pressure of the copolymer can be further reduced to 0 to about 10 p.s.i. and the molten copolymer can then be extruded, cooled, and pelletized.

The copolymer of this invention may be molded or converted to a film by any convenient procedure. The film may be blown, flat, or cast. Films may be formed in thicknesses ranging in gauge from about 0.5 mil, suitable for use as garment bags, up to about 10 mils, suitable for use as tarpaulins.

The copolymer of this invention may also be used to improve the properties of waxes, such as petroleum-derived waxes, either microcrystalline or paraffin; synthetic waxes; and so forth. Such compositions are expected to have unique properties of toughness, scuff resistance, adhesive strength, ductility, gloss, low water vapor transmission, and processability. The amount of ethylene/vinyl stearate copolymer blended with the wax may very over a wide range so that such compositions are useful, for example, as coatings, e.g., for paper, cardboard, cloth, fiber, foil, plastics such as polyolefins, rug backings, and the like; moldings, e.g., molded food containers, disposable containers, etc., laminates, e.g., for adhering various substrates together, as aluminum to cellophane, aluminum to polyolefins such as polypropylene; etc.

If desired, the copolymer of this invention may be used in finely-divided form, that is, where the copolymer has an average size of less than about 10 mesh. The finely-divided, or powdered, material may be used, for example, in dry form to coat articles by dip coating in either a static or fluidized bed, by powder coating wherein the powder is applied by spraying or dusting, and by flame spraying. In dispersed form, the powders may be applied as coatings by roller coating, spray coating, slush coating, and dip coating to a variety of substrates. The powder also may be foamed and/or used in powder molding techniques; as a paper pulp additive; a mold release agent for rubber; an additive to waxes, paints or polishes; a binder for non-woven fabrics; and the like. The finely-divided material may be prepared by mechanical grinding, by solution or dispersion techniques, or by any other convenient method.

The invention will be more fully understood by reference to the following examples which are illustrative only and which are not intended to limit the scope of the invention except as indicated by the appended claims. Unless otherwise specified, all parts are given by weight.

The *density* of the product is determined, in gram/cc., by a hydrostatic method, that is, by weighing a sample of the copolymer at 23° C., first in air and then in kerosene (ASTM test method D792–60T).

*Melt index* describes the flow behavior of a product at a specified temperature and under a specified pressure. It is here determined (ASTM test method D1238–57T) by measuring the flow rate, expressed in grams/10 minutes, on extrusion through an orifice 0.0825 inch in diameter by 0.315 inch long under a pressure of 43.1 p.s.i. at 190° C.

The *yield strength* is the tensile stress, in pounds per square inch of cross-sectional area of the test specimen, at which the slope of a stress-strain curve first becomes zero (ASTM test method D638–60T).

*Torsional stiffness*, measured in accordance with ASTM test method D1043–51, is the value obtained by measuring the angular deflection occurring when the specimen is subjected to an applied torque.

The heat softening point (*Vicat softening temperature*) is the temperature at which the test specimen becomes too soft to withstand stresses and keep its shape. It is the temperature at which a flat-ended needle of 1 sq. mm. cross-section under a load of 1 kg. penetrates 1 mm. into a specimen. The temperature of the sample is increased at a uniform rate (ASTM test method D1525–58T).

*Stress crack resistance* is determined as follows (ASTM test method D1693–60T): bent specimens of the plastic having a controlled imperfection on one surface are exposed to the action of a surface active agent. The proportion of the total number of specimens which crack in a given time is observed.

*Impact strength* or toughness is measured by the dart drop test (ASTM test method D1709–59T) in which a dart is dropped onto a clamped, tightly-held sheet of the material to be tested. The dart is a 1½-inch plastic hemisphere at the end of a short rod. The rod can be loaded with removable weights. The 50% failure point for the sample, as expression of its impact strength, is determined by plotting the percent failure of each set against the weight in grams.

Tearing resistance to a fast shearing strength is measured with the Elmendorf tearing tester in accordance with ASTM test method D689–44. The moving part of the machine is a free-swinging pendulum initially held in a raised position, with means for releasing it instantly. The Elmendorf tester determines the force required to propagate a tear along a standardized film specimen, slit according to specification, at a rapid rate of shear. The film is held between a stationary clamp and a movable clamp carried on the pendulum. The work, in gram-centimeters, done by the pendulum when tearing the specimen is read on a scale of the pendulum. The force required to tear the film is figured in grams per mil of film thickness.

EXAMPLE I (A) Ethylene admixed with 4 weight percent, based on ethylene, of vinyl stearate as comonomer and 0.040 weight percent, based on ethylene, of dilauroyl peroxide as catalyst were fed into a conventional autoclave reactor. The temperature inside the reactor was 369° F. and the reactor pressure was maintained at 20,000 pounds per square inch. The conversion achieved was about 8.7 percent. A solid copolymer was continuously produced.

Compression molded plaques for testing the mechanical properties of the copolymer were made on an Atlas press at 300° F. The plaques were cut into test specimens suitable for use on conventional instruments for measurement of mechanical properties. Properties of the product are tabulated below.

Blown film (1.5 mils thick) of the copolymer was extruded at 325° F. on a 2-inch Egan extruder with a 16:1 L:D ratio and a 2.5:1 blow-up ratio. The extruder output was about 25 pounds per hour. Properties of the product are tabulated below.

(B) The procedure of Example IA was repeated except that no comonomer was used. The properties of the comparative ethylene homopolymer are tabulated below.

EXAMPLE II (A) The procedure of Example IA was repeated except that the amount of vinyl stearate was 2.8 weight percent, the catalyst was 0.008 weight percent of t-butyl perbenzoate, and the reactor temperature was 444° F. The conversion achieved was 11.4 percent. Results are tabulated below.

(B) The procedure of Example IIA was repeated except that no comonomer was used. The properties of the ethylene homopolymer are tabulated below.

Table

|  | Results of Example | | | |
|---|---|---|---|---|
|  | IA | IB | IIA | IIB |
| Density | 0.929 | 0.925 | 0.922 | 0.920 |
| Melt Index | 4.99 | 4.00 | 2.91 | 3.13 |
| Haze, percent | 19.7 | 22.0 | 23.9 | 21.3 |
| Gloss, percent | 5.0 | 4.4 | 3.9 | 4.8 |
| Transmittance, percent | 3.2 | 8.9 | 1.4 | 1.3 |
| Elmendorf Tear: | | | | |
| MD [1] | 78.8 | 75.3 | 74.4 | 50.5 |
| TD [1] | 106.9 | 84.0 | 73.0 | 67.7 |
| Dart Drop, grams | 52 | 74 | 87 | 96 |
| Elongation, percent: | | | | |
| MD | 292 | 279 | 279 | 251 |
| TD | 423 | 356 | 491 | 427 |
| Tensile Strength, p.s.i.: | | | | |
| MD | 1,690 | 1,980 | 2,050 | 2,000 |
| TD | 1,580 | 1,770 | 1,960 | 2,010 |
| Yield Strength, p.s.i.: | | | | |
| MD | 1,480 | 1,670 | 1,240 | 1,280 |
| TD | 1,420 | 1,740 | 1,170 | 1,290 |
| Modulus, p.s.i.: | | | | |
| MD | 19,900 | 28,300 | 18,700 | 20,600 |
| TD | 22,400 | 34,300 | 21,200 | 23,700 |
| Torsional Stiffness, p.s.i. | 31,700 | 51,300 | 28,800 | 32,700 |
| Low Temperature Brittleness, ° C. for F50 | >−76 | <−76 | >−76 | <−76 |
| Stress Crack, hours for F50 | <48 | <0.25 | <48 | <0.25 |
| Vicat Softening Point, ° C | 97.2 | 100.4 | 92.6 | 94.0 |

[1] MD—Machine Direction; TD—Transverse Direction.

As can be seen from the tabulated data, the copolymers of ethylene and vinyl stearate are superior in mechanical properties to the comparative ethylene homopolymers made under the same reaction conditions. The copolymers in general have higher stress crack resistance and lower strength and stiffness.

While there are above disclosed but a limited number of embodiments of the process of the invention herein presented, it is possible to produce still other embodiments without departing from the inventive concept herein disclosed.

What is claimed is:
1. A process for copolymerizing ethylene and vinyl stearate which consists reacting a mixture of ethylene and about 0.1 to about 15 weight percent, based on the ethylene feed, of vinyl stearate at a temperature between about 250° and 500° F. and a pressure of about 18,000 to about 45,000 pounds per square inch in the presence of an organic peroxide copolymerization catalyst in a stirred closed reaction zone.
2. The process of claim 1 wherein the temperature is between about 300° and 450° F. and the pressure is between about 20,000 and 40,000 pounds square inch.
3. A copolymer of ethylene and vinyl stearate prepared by the process of claim 1.
4. A process for copolymerizing ethylene and vinyl stearate which consists reacting a mixture of ethylene and about 2 to about 10 weight percent, based on the ethylene feed, of the vinyl stearate at a temperature between about 300° and 450° F. and a pressure between about 20,000 and 40,000 pounds per square inch in the presence of an organic peroxide copolymerization catalyst in a stirred closed reaction zone.
5. A copolymer of ethylene and vinyl stearate prepared by the process of claim 4.

References Cited by the Examiner

UNITED STATES PATENTS 2,342,400   2/1944   Heopff et al. _____ 260—87.3

FOREIGN PATENTS 569,927   6/1945   Great Britain.

OTHER REFERENCES

Odian et al.: U.S. Atomic Energy Comm. NYO–2530, pages 59–65 (1961).

JOSEPH L. SCHOFER, *Primary Examiner.*

JOSEPH R. LIBERMAN, WILLIAM H. SHORT,
*Examiners.*

UNITED STATES PATENT OFFICE
CERTIFICATE OF CORRECTION

Patent No. 3,222,336 December 7, 1965

Thomas S. Heines, Jr., et al.

It is hereby certified that error appears in the above numbered patent requiring correction and that the said Letters Patent should read as corrected below.

Column 5, in the table, the values opposite "Low Temperature Brittleness, °C. for F50" should appear as shown below instead of as in the patent:

<-76     <-76     <-76     <-76 same table, the values opposite "Stress Crack, hours for F50" should appear as shown below instead of as in the patent:

>48     <0.25     >48     <0.25

Signed and sealed this 27th day of December 1966.

(SEAL)
Attest:

ERNEST W. SWIDER
Attesting Officer

EDWARD J. BRENNER
Commissioner of Patents